United States Patent
Subramanian et al.

(10) Patent No.: US 8,259,726 B2
(45) Date of Patent: Sep. 4, 2012

(54) METHOD AND APPARATUS FOR FORWARDING TABLE REDUCTION

(75) Inventors: Krishnamurthy Subramanian, Mountain View, CA (US); Arun Viswanathan, Cupertino, CA (US)

(73) Assignee: Force10 Networks, Inc., San Jose, CA (US)

( * ) Notice: Subject to any disclaimer, the term of this patent is extended or adjusted under 35 U.S.C. 154(b) by 294 days.

(21) Appl. No.: 12/789,545

(22) Filed: May 28, 2010

(65) Prior Publication Data

US 2011/0292939 A1 Dec. 1, 2011

Related U.S. Application Data

(60) Provisional application No. 61/181,839, filed on May 28, 2009.

(51) Int. Cl.
*H04L 12/28* (2006.01)
(52) U.S. Cl. .......................... 370/392; 370/401
(58) Field of Classification Search .................. 370/351, 370/389, 392, 395.54, 401
See application file for complete search history.

(56) References Cited

U.S. PATENT DOCUMENTS

| | | | |
|---|---|---|---|
| 7,619,989 B2 * | 11/2009 | Guingo et al. | 370/254 |
| 2005/0111384 A1 * | 5/2005 | Ishihara et al. | 370/254 |
| 2006/0182034 A1 * | 8/2006 | Klinker et al. | 370/238 |
| 2007/0008949 A1 * | 1/2007 | Balandin | 370/351 |
| 2009/0257439 A1 * | 10/2009 | Xu | 370/401 |
| 2011/0222544 A1 * | 9/2011 | Medina et al. | 370/392 |

\* cited by examiner

*Primary Examiner* — Hong Cho
(74) *Attorney, Agent, or Firm* — Haynes and Boone, LLP

(57) ABSTRACT

A LAN includes a router that is connected to two or more racks of servers and each of the servers can support a plurality of virtual machines. The router is configured to forward data packets based on IP destination addresses or based on destination MAC addresses and builds and maintains forwarding tables in support of data packet forwarding in the layer 3 and the layer 2 network environment. In support of layer 2 forwarding, the router builds and maintains an aggregated MAC switching table that is comprise of a subset of the table entries typically needed to switch packets to their destination, and in support of layer 3 forwarding, the router or switch builds and maintains an aggregated ARP forwarding table that is comprised of a subset of the table entries typically needed to forward packets to their destination.

21 Claims, 11 Drawing Sheets

FIG. 3

FULL FORWARDING TABLE 25A

| IP.DA | DESTINATION MAC | VLANID | EGRESS INT. |
|---|---|---|---|
| IP.DA (TOR.0) | MAC | VLAN.0 | P.0 |
| IP.DA (VM.0) | MAC | VLAN.0 | P.0 |
| ... | ... | ... | ... |
| IP.DA (VM.127) | MAC | VLAN.0 | P.0 |
| IP.DA (TOR.119) | MAC | VLAN.100 | P.119 |
| IP.DA (VM.0) | MAC | VLAN.100 | P.119 |
| ... | ... | ... | ... |
| IP.DA (VM.127) | MAC | VLAN.100 | P.119 |

ENTRY

FIG. 4

AGGREGATED FORWARDING TABLE 23B

| IP.DA | DESTINATION MAC | EGRESS INTERFACE |
|---|---|---|
| IP.DA (TOR.0) | MAC | P.0 |
| AGGR. IP.DA (VM) (FIRST FIELD) | DERIVE MAC (SECOND FIELD) | P.0 (THIRD FIELD) |
| IP.DA (TOR.1) | MAC | P.1 |
| AGGR. IP.DA (VM) | MAC | P.1 |
| ... | ... | ... |
| IP.DA (TOR.119) | MAC | P.119 |
| AGGR. IP.DA (VM) | DEVIVE MAC | P.119 |

ENTRY → (points to second row)

FIG. 8

FULL SWITCHING TABLE 76B

| DESTINATION MAC | EGRESS INTERFACE |
|---|---|
| OUI/IP.DA (TOR.0) | PORT 0 |
| OUI/IP.DA (VM.0) | PORT 0 |
| ⋯ | ⋯ |
| OUI/IP.DA (VM.127) | PORT 0 |
| ⋯ | ⋯ |
| OUI/IP.DA (TOR.119) | PORT 119 |
| OUI/IP.DA (VM.0) | PORT 119 |
| ⋯ | ⋯ |
| OUI/IP.DA (VM.127) | PORT 119 |

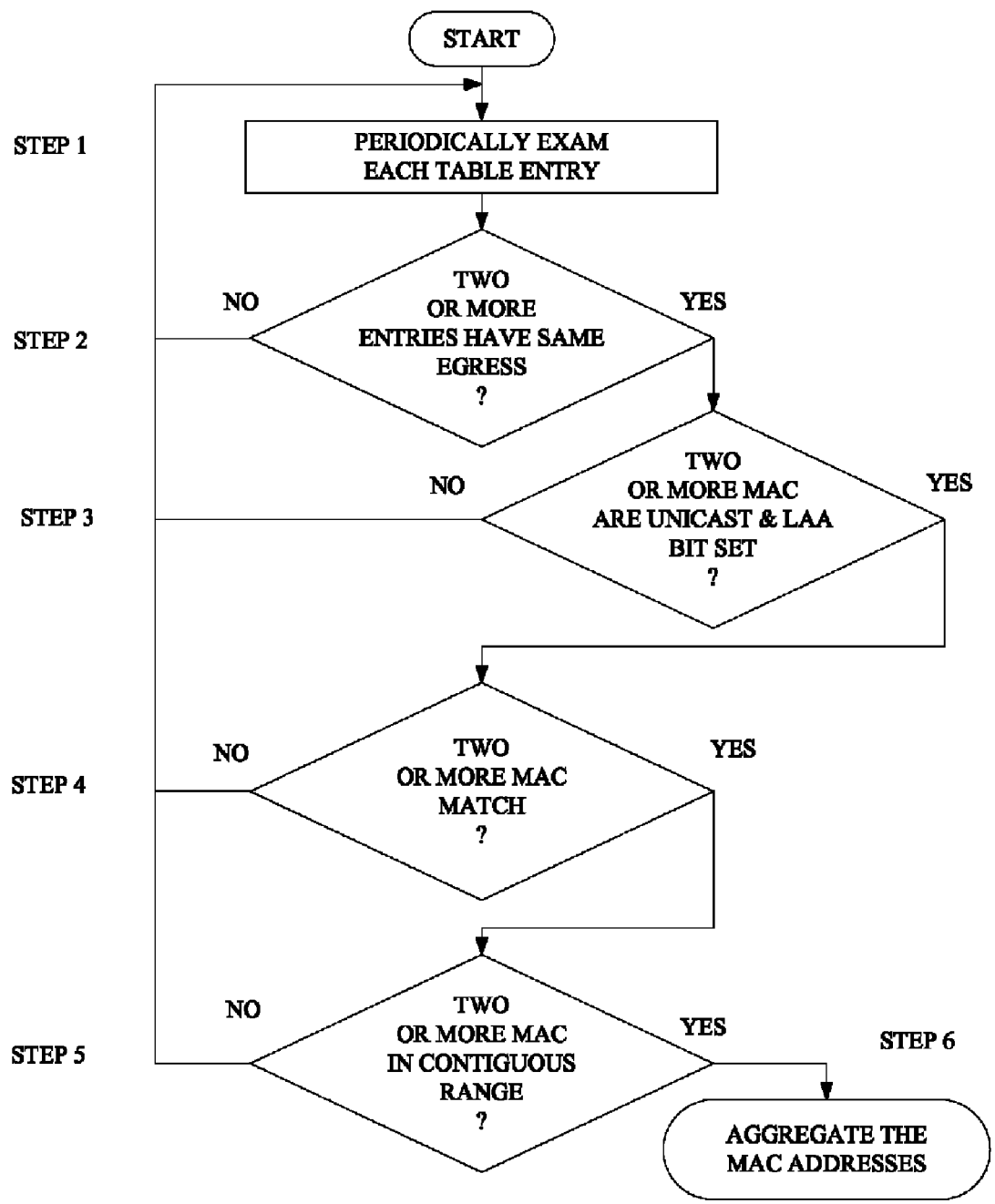

FIG. 9

AGGREGATED MAC FORWARDING TABLE 74B

| DESTINATION MAC | EGRESS INTERFACE |
|---|---|
| OUI/IP.DA (TOR.0) | PORT 0 |
| AGGR. OUI/IP.DA | PORT 0 |
| ... | ... |
| OUI/IP.DA (TOR 119) | PORT 119 |
| AGGR. OUI/IP.DA | PORT 119 |

ENTRY 90

METHOD AND APPARATUS FOR FORWARDING TABLE REDUCTION

This application claims priority to U.S. Application No. 61/181,839 filed on May 28, 2009, the entire disclosure of which is incorporated herein by reference.

BACKGROUND

1. Field of the Invention

The present disclosure relates generally to communications network technology and specifically to the processes employed by packet network devices comprising a communications network for forwarding data packets from one packet network device to another.

2. Description of the Related Art

Packet network devices direct data packets traveling across a communications network between data sources and destinations. Packet network devices can perform "routing" or "switching" depending upon the header information and the networking techniques used to direct the data packets. A single packet network device may be configured to perform routing or switching or both routing and switching and both of these types of packet network device are referred to herein as a "packet switch" with the understanding that that this term encompasses a wide variety of packet forwarding capabilities. Generally, packet switches operate to receive a data packet at an ingress port, process the data packet to determine the destination or next hop that the packet should be sent to (if the switch is not itself the destination) and then send the data packet out an egress port to its proper destination. After the data packet arrives at the ingress port to the packet switch, the switch typically examines the header in the data packet for information that indicates the address of the destination device to which the data packet is to be sent. This could be another packet switch or it could be the current packet switch that received the data packet. Each packet switch typically builds and maintains forwarding tables which include information that is uses, in conjunction with the information it detects in the data packet header, to determine how to forward the data packet to a next hop in the network.

Ethernet networks have become ubiquitous and are growing in popularity and usage, especially in the Data Center (DC) environment. This popularity is driving the large scale adaptation of Ethernet which in turn is driving down the cost and increasing the speed at which these networks operate. With the large scale adaptation of Ethernet technology, the number of nodes (packet network devices, routers, switching, virtual machines) on the Ethernet network increases. In addition to the increasingly more numerous physical/actual nodes connected to such a network, each actual node can support a number of virtual machines (VM). Each VM is assigned a different MAC address, which depending upon the number of virtual machines in a local network can result in a large number of MAC addresses being maintained in the forwarding tables of packet switches that are aware of some or all of the virtual machines.

An Ethernet MAC address consists of two components each one of which is 24 bits in length. The first component is a manufacturer's organizationally unique identifier (OUI) which is controlled by the IEEE and which comprises the higher order 24 bits of the MAC address, and the second component, comprising the lower 24 bits, is a running number controlled by the manufacturer which can be a number identifying a particular network interface device or just about another other type of information the manufacturer wishes. While this scheme ensures that each MAC address is globally unique, it results in a flat (as opposed to hierarchical) address space which results in the packet network devices building flat forwarding tables.

Network switches can learn the MAC addresses of neighboring network devices by observing the source address in the frames that they receive from the other devices and making an entry in their forwarding tables mapping the source MAC address to the port on which this packet was received by the switch. Subsequently when a data packet is received that includes this MAC address as the MAC DA, the packet is switched out on the port identified by the table entry and not flooded to the entire network. Typically, the packets entering a packet switch are processed by a packet processor device that includes a limited amount of on-board memory to store the forwarding tables. The requirement to increase the size of these forwarding tables to accommodate such a flat MAC addressing scheme become untenable even for the high end switches available in the market. As a consequence of building and maintaining flat forwarding tables in the data plane of a packet network device and as a result of device location information not being included in the MAC address, network switches which forward traffic based on the MAC address typically learn the MAC addresses of all the nodes in the network that they can reach. Consequently, the forwarding table in a switch can have one entry for each of these MAC addresses. In a DC with a large number of virtualized nodes or VMs, this can result in the need to build a forwarding table that includes 100,000 entries or more.

When multiple layer 2 (L2) networks are connected together through a virtual LAN (VLAN) or normal packet network device such as a router, the device which is forwarding the data between these networks will have to maintain a large layer 3 (L3) host (ARP) forwarding table. If a packet network device is forwarding data packets between two VLANs, VLAN1 and VLAN2 for instance, and a node A in VLAN1 wants to send a packet to node B in VLAN2, node A sends the data packet to the packet network device and the network device can run the well known address resolution protocol (ARP) in VLAN2 in order to learn the physical network address of node B. The packet network device uses the results of ARP to creates an entry in its L3 forwarding table that includes the physical address (MAC address) of node B and the next hop information which will consist of the egress port (The port on which the ARP reply was received) and other L2 information that may be needed. In a data center environment where the network is organized in terms of VLANs, each of which are dedicated to provide a particular service, a request can be received that can only be fulfilled by gathering information from multiple services. Such a service request can result in a high level of inter-VLAN communication, and as a consequence, the packet network device have to populate its L3 forwarding table with the MAC destination address (DA) of all the nodes in all the VLANs. Further, if some or all servers associated with the VLANs are configured with multiple virtual machines, then the number of physical addresses that need to be learned and stored in the L3 forwarding table could be more than 100,000 entries. Unfortunately, there are limits to the amount of on-board memory space that is specifically reserved for these L2 and L3 forwarding tables, and so creating and maintaining such a large number of table entries is problematical.

Therefore, in light of the problems associated with creating and maintaining very large forwarding tables in the hardware of the data plane of a packet network device, it would be advantageous to reduce the forwarding table size requirements for both L2 and L3 forwarding tables while providing line-speed packet processing.

SUMMARY

It was discovered that it is not necessary to populate layer 2 or layer 3 tables, used by a packet network device to forward data packets, with the network addresses of every network node reachable by the packet network device. A reduction in the number of entries into the forwarding tables is accomplished by aggregating two or more network addresses learned by the packet network device subject to a set of predetermined aggregation conditions or rules.

In one embodiment, a packet network device learns the IP and MAC addresses of all nodes in a network that it can transmit data packets to and stores the address information with the egress interface on which the addresses are learned into entries in a first table, the packet network device then examines the addresses stored in each of the first table entries to determine, subject to a set of aggregation conditions, whether two or more of the addresses can be aggregated into a single summary address and stores the aggregated summary address in a single entry in a second table along with the associated portID.

In another embodiment, a packet network device learns the MAC addresses of all nodes in a network that it can transmit data packets to and stores the address information with the egress interface on which the addresses are learned into a first table, the packet network device then examines the addresses stored in each of the first table entries o determine, subject to a set of aggregation conditions, whether two or more of the addresses can be aggregated into a single, summary address and stores the aggregated summary address in a single entry in a second table along with the associated portID.

BRIEF DESCRIPTION OF THE DRAWINGS

FIG. 3 is an illustration of an ARP forwarding table structure included in the router of FIG. 2.

FIG. 4 is an illustration of an aggregated ARP forwarding table structure included in the router of FIG. 2.

FIG. 8 is an illustration of a MAC forwarding table included in the switch of FIG. 7.

FIG. 8a is a logical flow diagram of the process for aggregating two or more destination MAC addresses.

FIG. 9 is an illustration of an aggregated MAC forwarding table structure included in the router of FIG. 7.

DETAILED DESCRIPTION

Cross Reference to Related Applications

This application claims the benefit under 35 U.S.C. §119 (e) of U.S. Provisional Patent Application Ser. No. 61/181, 839 entitled "Method & Apparatus for Forwarding Table Reduction", filed May 28, 2009, the entire contents of which is incorporated by reference.

Figure 1:
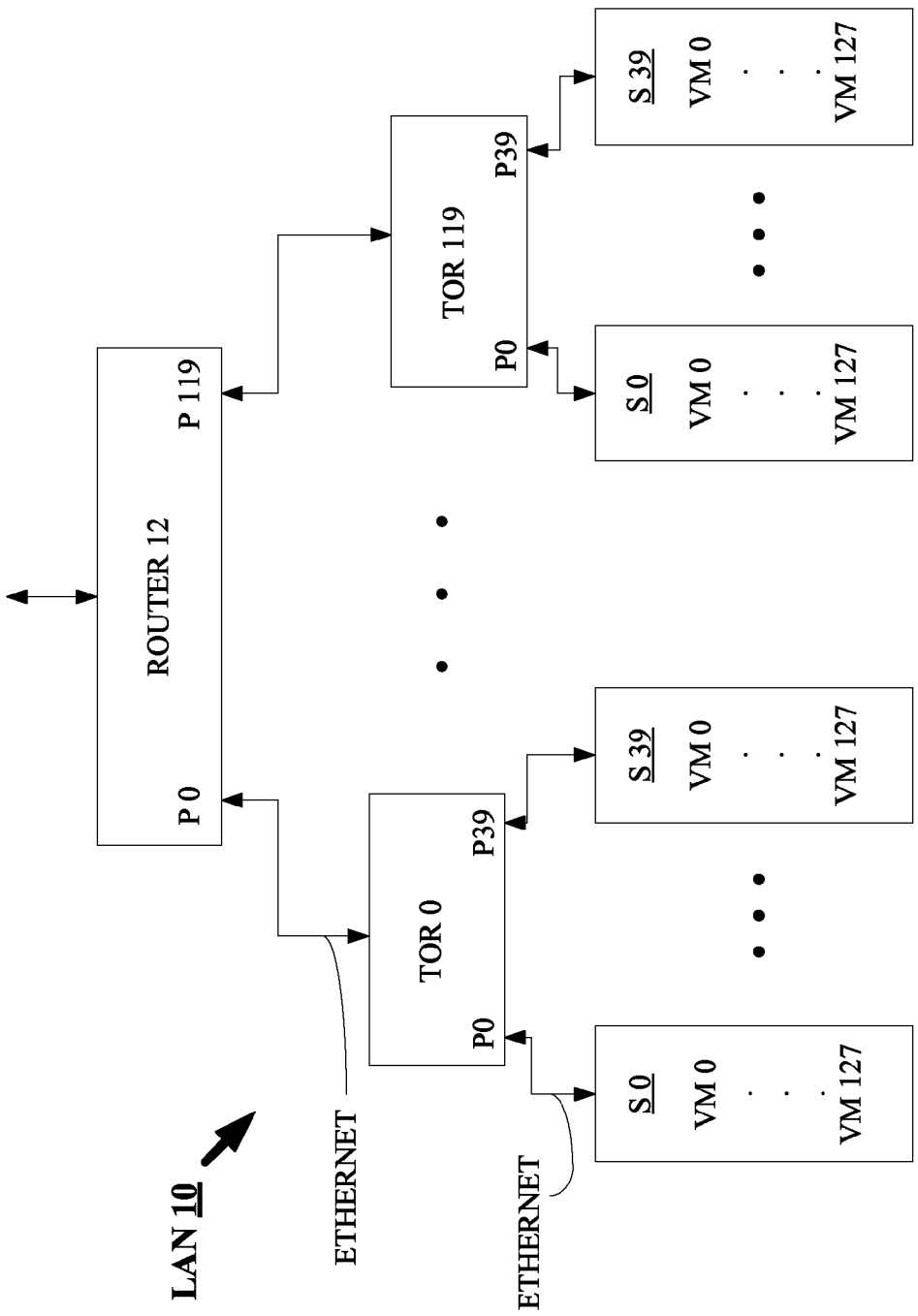
FIG. 1 is a diagram showing a router, a plurality of switches and servers in a LAN configuration.

In order to take advantage of economies of scale, local area networks can be configured with many hundreds or thousands of servers or nodes, each of which, among other things, can support one or more databases or services for instance. The databases can be designed to store customer account information or general information (product information, etc.) that is made available to the public or to subscribers. The services can be directed to sales activities, viewing financial records, corporate information or any general information for example. The servers in such a LAN can be arranged in a rack configuration, and all of the servers in the rack can be in communication with one or more switches which is typically referred to as a top of rack (TOR) device. The TOR device in turn can be connected to a router which operates to transmit and receive information to and from packet network devices associated with other networks. Routers, switches and servers configured in this manner and for the purposes described above are typically referred to as data centers. FIG. 1 is illustrative of the devices and the architecture comprising a typical data center.

As mentioned above, FIG. 1 illustrates a particular data center LAN 10 configured with one core router 12 that is connected over ports P0 to P119 to, in this case, one hundred twenty TOR switches 0-119. The core router 12 can operate in the network layer (L3) only or in both the network and link layers (L3/L2) to forward data packets received from an outside network 11 to the plurality of servers comprising the data center LAN 10. The router 12 is configured with one hundred twenty sets of ingress and egress ports which respectively operate to receive and transmit data packets from and to each of the TOR switches 0-119 over Ethernet links 0-119. Each of the TOR switches generally operate in the link layer (L2) to switch traffic to and from the forty servers comprising the rack of servers 0-39 over a set of forty ingress and egress ports each one of which is connected to one server over an Ethernet link. Each of the servers in a rack of servers can support one or more virtual machines (VM) each of which can be responsible for supporting one aspect of the data center operation, such as supporting a customer database or sales activities of a particular product or products.

Although the LAN 10 of FIG. 1 includes only one router 12 in communication with one hundred twenty TOR switches each of which supports forty servers, more than one router 12 can be included to provide a redundant path into and out of the LAN 10. Also, each router 12 is not limited to only supporting one hundred twenty TOR switches and each TOR switch is not necessarily limited to only supporting forty servers. More or fewer TOR switches and servers can comprise the LAN 10 depending upon the operational needs of a data center. Also, each server is not necessarily limited to supporting only one hundred twenty virtual machines.

Figure 2:
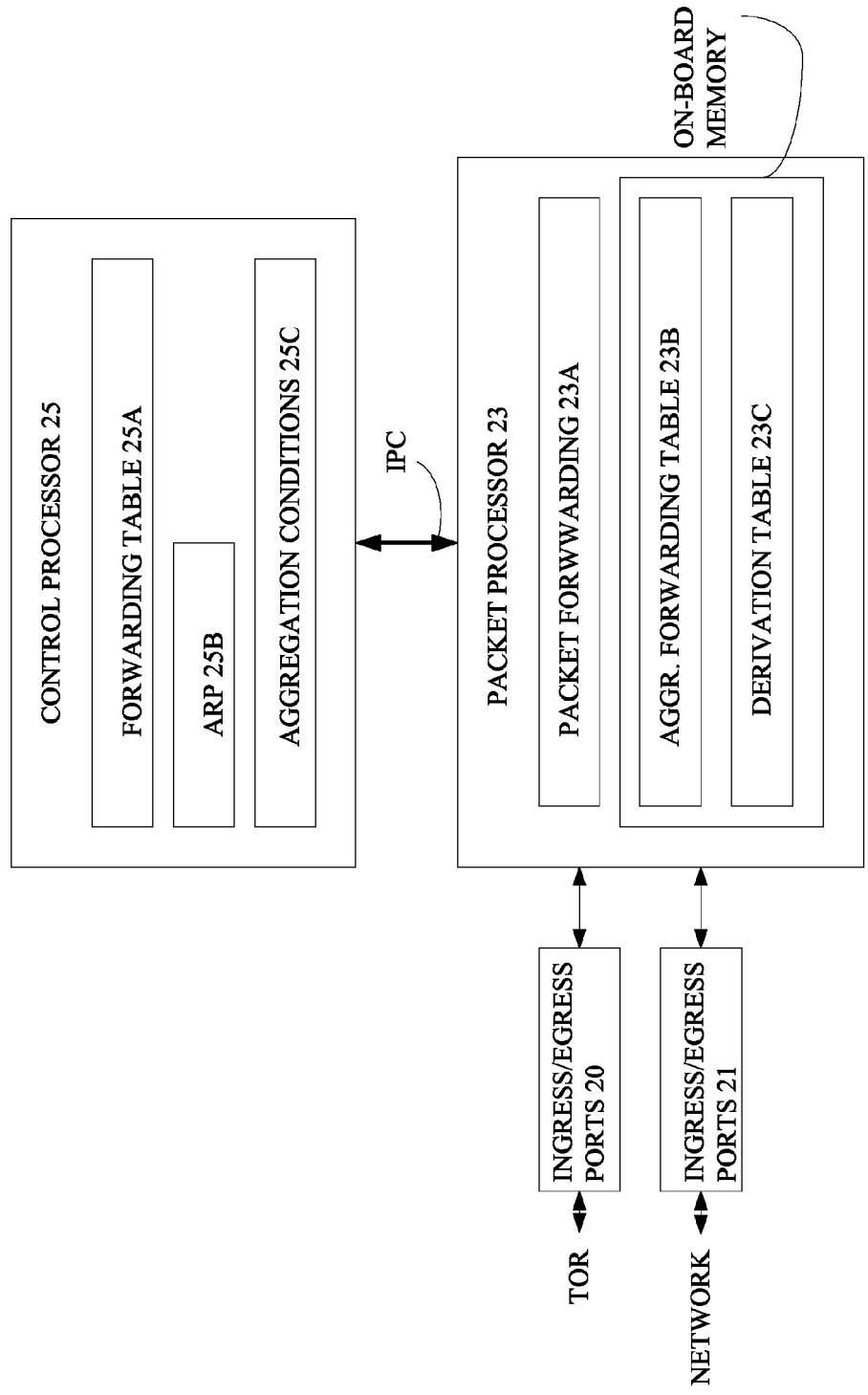
FIG. 2 is a functional block diagram of the router of FIG. 1.

FIG. 2 is a diagram showing functionality that router 12, described with reference to FIG. 1, employs in one embodiment to support layer 3 forwarding of data packets in the LAN 10. One set of ingress/egress ports 20 are shown connected to a packet processor 23 that operates in the forwarding plane of the router 12. The set of ingress/egress ports 20 represents one hundred twenty sets of ingress/egress port pairs. Only one pair is shown here for simplicity of description, but it should be understood that block 20 is not limited to only one hundred twenty ingress/egress pair. Each of the ingress/egress ports 20 operate to receive and transmit data packets to and from one of the TOR switches 0-119. The packet processor 23 can be implemented as a single electronic device or as multiple devices that operate together to perform a data packet forwarding operation. Generally, the packet processor 23 is comprised of data packet forwarding functionality 23a that operates to examine information included in the header of each data packet arriving at the router 12 in order to determine how to forward the data packet, it includes on-board memory for storing layer 3 and layer 2 forwarding tables 23b that it uses to forward data packets, and it includes in one embodiment a lookup table that stores information used to derive the destination network address of a data packet. Router 12 also includes a control processor 25 that is in communication with the packet processor 23 over an inter-process communication (IPC) link. The control processor 25 typically comprises functionality that operates in the control plane of the router 12 and can be implemented on a single electronic device or on multiple devices. Regardless, the control processor 25 can run an address resolution protocol 25b (ARP) or other protocol that operates to learn the network addresses of neighboring network devices which or nodes which are employed by the control processor to build and maintain at least a portion of a full layer 3 ARP forwarding table 25a. Such a forwarding table can be comprised of an IP destination address (IP.DA), a medium access control (MAC) address, VLAN ID and an egress portID over which to transmit a data packet. In this case, and in one embodiment, the control processor 25 includes a set of aggregation conditions 25c that the router 12 uses in combination with information in full forwarding table 25a to build and maintain the aggregated forwarding table 23b. The aggregated forwarding table 23b that can be stored in on-board packet processor memory includes significantly fewer entries than are included in table 25a. In operation, the control processor employs information in the full forwarding table 25a and the set of aggregation conditions 25c determine that two or more network addresses can be aggregated into a single, aggregated network address that the control processor 25 then places into a single entry in the aggregated forwarding table 23b. As a result of this aggregation process, the forwarding table 23b optimally includes only a subset of the network addresses that comprise the full forwarding table 25a maintained by the control processor 25.

Continuing to refer to FIG. 2, and as mentioned earlier, the forwarding table 23b is optimally comprised of only a fraction of the number of table entries included in the full forwarding table 25a maintained by the control processor 25. Typically, a full forwarding table used by a packet processor to forward packets includes all of the IP destination addresses (IP.DAs) and all of the destination MAC addresses that it learns during the ARP process. More specifically, a typical prior art L3 forwarding table entry is created for each IP.DA/MAC address pairs learned by the ARP process. As described earlier with reference to FIG. 1, each of the forty servers 0-39 managed by each of one hundred twenty TOR devices 0-199 can support one hundred twenty eight VMs, and each VM is assigned a different MAC address. In this case, the total number of MAC addresses, and so the total number of table entries, that can be included in the full forwarding table 25a comes to a total of six hundred fourteen thousand four hundred (614,400). In order to achieve a significant reduction in the number entries in a full L3 forwarding table, it was discovered that the number of table entries can be reduced by aggregating IP.DAs according to a predetermined set of aggregation conditions 25c. As the result of populating the forwarding table 23b with aggregated IP.DAs, it is not possible to include destination MAC addresses in the table entries that include aggregated addresses, but rather the table entry field that would otherwise include the destination address can include a derivation function that operates to derive a destination address with information included in an address derivation table 23c. The derivation function includes instructions the packet processor can use to retrieve information stored in the derivation table 23c and information included in an IP.DA (IP.DA of a received packet) to derived a destination address. The address derivation table 23c (derivation table), can be stored either in the packet processor on-board memory 26 or in memory on the router 12 accessible by the packet processor. Each entry in the address derivation table 23c can be comprised of, but is not limited to, an organizationally unique identifier (OUI) and at least a portion of the information included in an IP.DA associated with the OUI. The IP.DA contained in the header of a data packet received by the router 12 can then be used by the packet processor 23 as a key into the derivation table 23c to identify the particular OUI to with which to derive the destination MAC address.

FIG. 3 is an example format that can be used to implement the full ARP forwarding table 25a built by the control processor 25 of FIG. 2 in accordance with the LAN topology of FIG. 1. Each entry in table 25a can include but is not limited to an IP.DA field, a destination MAC address field, a VLANID field and a field that includes information about the interface on which the MAC address was learned, which is referred to in the table as an egress address or portID. As illustrated in FIG. 3, the table 25a includes entries for the IP.DA address of each TOR device and entries for the IP.DA of each of the VMs implemented in each one of the servers managed by each of the TOR devices. Optimally, the IP.DAs can be included in the table entries as groups of sequential addresses. So, for example, one group can include the following four sequential IP.DAs: 192.168.1.0, 192.168.1.1, 192.168.1.2, 192.168.1.3. As described earlier, there can often be restrictions on the amount of on-board memory space that is available in a packet processor to store forwarding tables, and so it is problematical if the number of table entries needed to forward data packets in the LAN exceeds memories capacity to store these table entries.

Figure 3A:
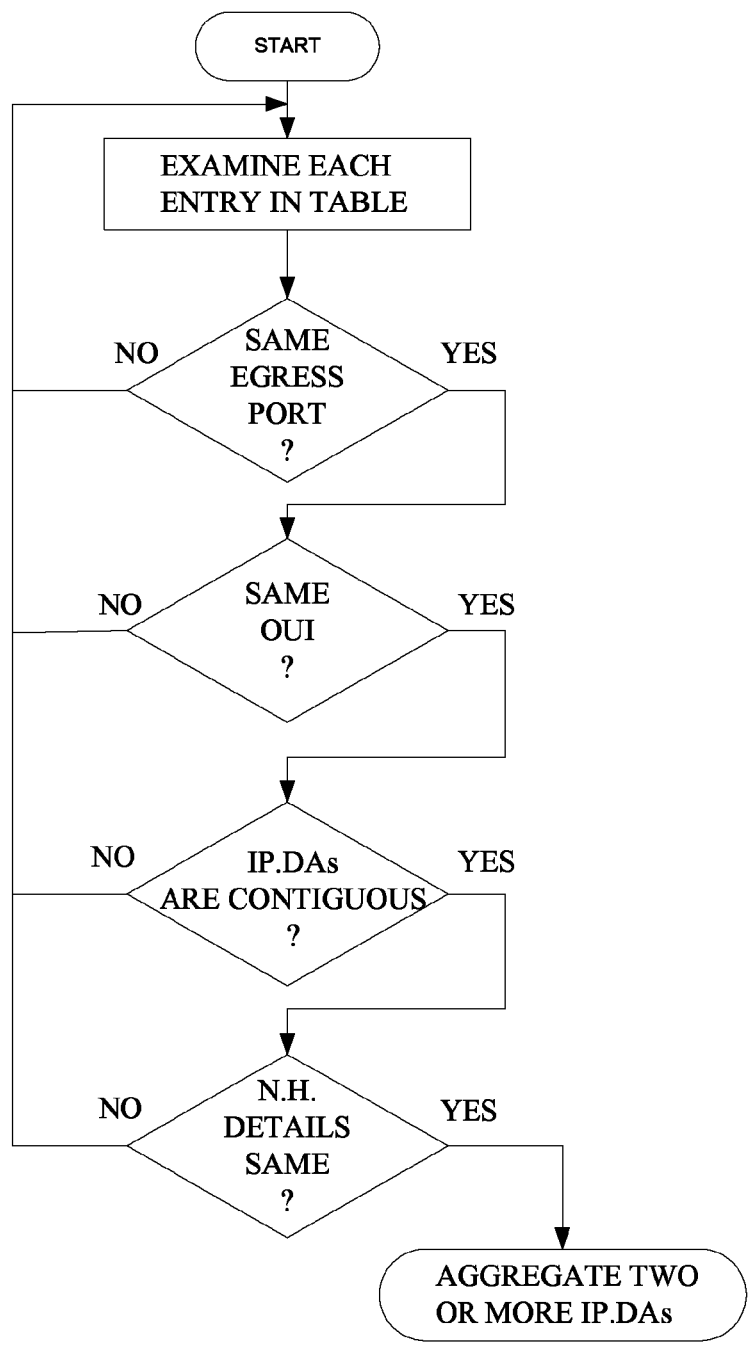
FIG. 3a is a logical flow diagram of a network address aggregation process.

FIG. 3A is a logical flow diagram of the process that can be used to aggregate two or more IP.DAs included in the full ARP forwarding table 25a, described earlier with reference to FIG. 3, and which can be placed into the aggregated forwarding table 23b described later with reference to FIG. 4. While the operation of IP.DA aggregation is described here as a serial process, the order of the steps can be modified. Also, it should be understood that although IP.DA aggregation is described here as a serial process, it can also be performed in a parallel manner. Further, and as described earlier, depending upon the table size reduction desired, different or additional aggregation conditions can be included in the set of aggregation conditions subject to the conditions not altering the forwarding behavior of the router 12. In step 1, the control processor 25 of FIG. 2 can periodically examine a portion or all of the entries in the full forwarding table 25a to determine whether any two or more entries meet certain pre-determined aggregation conditions. Assuming that the process is serial, if in step 2 it is determined that two or more entries include the same egress portID, the information included in the two or more entries identified in this step is stored and the process proceeds to step 3, otherwise the process returns to step 1. In step 3, the information in the two or more entries stored in the previous step is examined to determine whether two or more of these entries include the same organizationally unique identifier (OUI), if so then the process proceeds to step 4, otherwise the process returns to step 1. In step 4, the information in the two or more entries identified in step 3 is examined to determine whether the IP.DAs in the two or more entries identified in step 3 are contiguous. It should be understood that step 4 is optional, and so verification that two or more addresses are contiguous is not a requirement for the two or more addresses to be aggregated. If in step 4 it is determined that two or more entries include contiguous IP.DAs then the process proceeds to step 5, otherwise the process returns to step 1. In step 5, the process examines the information comprising the two or more table entries identified in step 4 to determine whether or not one or more elements of next hop information are the same, if this is the case, then in step 6 the two or more IP.DAs identified in step 5 are aggregated in a single, summarized IP.DA that is in a form that can be easily matched to an IP.DA included in a data packet received by the router 13 described with reference to FIG. 2.

FIG. 4 shows an example format that can be employed to implement the aggregated forwarding table 23*b* of FIG. 2. The number of table entries comprising table 23*b* is greatly reduced in comparison to the number of table entries comprising the full forwarding table 25*a* described with reference to FIG. 3. As in the full ARP table 25*a*, the aggregated forwarding table 23*b* also includes a separate entry for each TOR device, but in contrast to the full table 25*a*, the aggregated forwarding table 23*b* consists of a table entry that represents two or more IP.DAs as an aggregated IP.DA. In this case, the second entry from the top of table 23*b* is an aggregated IP.DA table entry, and the first field of the entry is populated with a destination address that is the aggregate of as many as one hundred twenty eight VM IP.DAs. As described earlier with reference to FIG. 2, these IP.DAs are aggregated according to a set of aggregation conditions or rules. Assuming that the MAC addresses assigned to each VM are formatted such that the first three bytes are an OUI and the second three bytes include at least a portion of an IP.DA, then two or more IP.DAs can be aggregated subject to the following four aggregation conditions; (a) all of the IP.DAs have the same egress portID, (b) the MAC addresses of each IP.DA all include the same OUI, (c) the IP.DAs are in a contiguous range of addresses (optional) and they can be summarized using a prefix, suffix or some other basis upon which to match the address, and (d) some or all of the next hop details such as among other things the VLAN and priority are the same. The four aggregation conditions itemized here are only exemplary and the embodiment is not limited only to these conditions.

Continuing to refer to FIG. 4, the second field in the second entry in the forwarding table 23*b* indicates that the destination MAC address for the IP.DA needs to be derived. This is due to the IP.DA in this field being an aggregation of two or more IP.DA addresses. In the event that a data packet is received by the router 12 with an IP.DA that matches the aggregated IP.DA entry for VM0 (second entry from top in table 23*b*), the second table entry can include an aggregation function, in the field (second field) otherwise populated by an actual destination MAC address. The aggregation function includes instructions that the packet processor 23 uses to derive the destination MAC address. These instructions direct the packet processor 23 to use a portion of the data packet IP.DA as a key into the derivation table 23*c*, to use information included in the first field of a derivation table 23*c* and at least a portion of the IP.DA included in the header of the data packet to derive the destination MAC address. Alternatively, the aggregation function can be included in the first few bits of the first field in the forwarding table 23*b*. The format of the derivation table will be described later in detail with reference to FIG. 5. The packet processor 23 uses the information retrieved from the derivation table 23*c* to derive a destination MAC address which is then entered into the header of the data packet prior to its being forwarded to its destination. It should be understood, that some entries in the aggregated ARP forwarding table 23*b* can be populated with non-aggregated IP.DAs. In this case, the table entry is populated with the actual destination MAC address and the data packet is forwarded over the egress portID associated with this MAC address to its destination. The first several bits (not shown) in each entry in the aggregated forwarding table 23*b* are reserved to indicate whether the entry is an aggregated entry or a non-aggregated entry. Also, these bits can indicate which aggregation conditions are used to aggregate the destination address in the forwarding table, they can include the aggregation function type (if more than one type of function is used) and they can include information associated with the function as necessary. Then, the packet processor 23 determines whether a table entry is an aggregated entry or a non-aggregated entry by examining the first several bits in the table at the time it access the table for a destination address.

Figure 5:
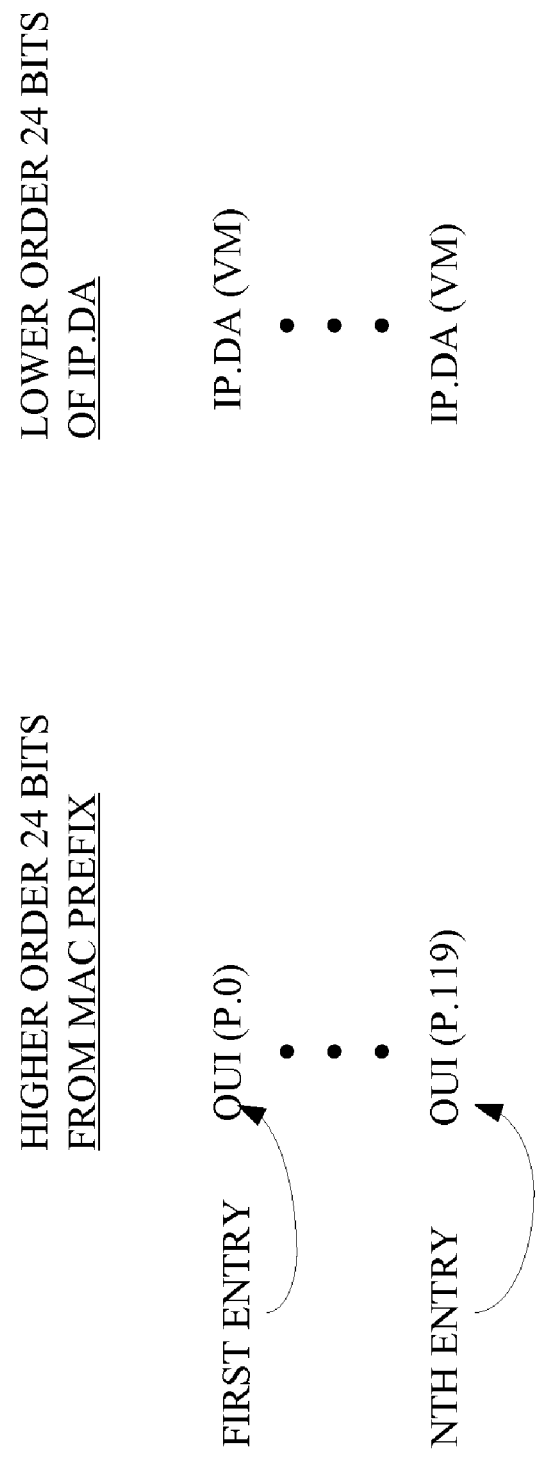
FIG. 5 is an illustration of a lookup table structure used to derive a MAC address.

FIG. 5 shows an example format for the MAC derivation table 23*c* described above and with reference to FIG. 2. This table is built using information comprising the full ARP forwarding table 25*a* which in turn is populated with, among other things, information learned during the ARP process. As was indicated earlier, although embodiments are described in the context of forwarding table populated with information learned during the ARP process, any process employed to learn destination address information is suitable for this purpose and the forwarding table can be formatted appropriately with the learned address information. However, in this embodiment, each entry in table 23*c* is comprised of two fields. The first field in the first entry comprising this table entry, and all subsequent entries up to entry n in the table, includes the OUI for a VM. and the OUI is comprised of the higher order twenty-four bits of the MAC address of the VM. The second field in this table entry includes the lower order twenty-four bits of the IP.DA of the VM.

Figure 6:
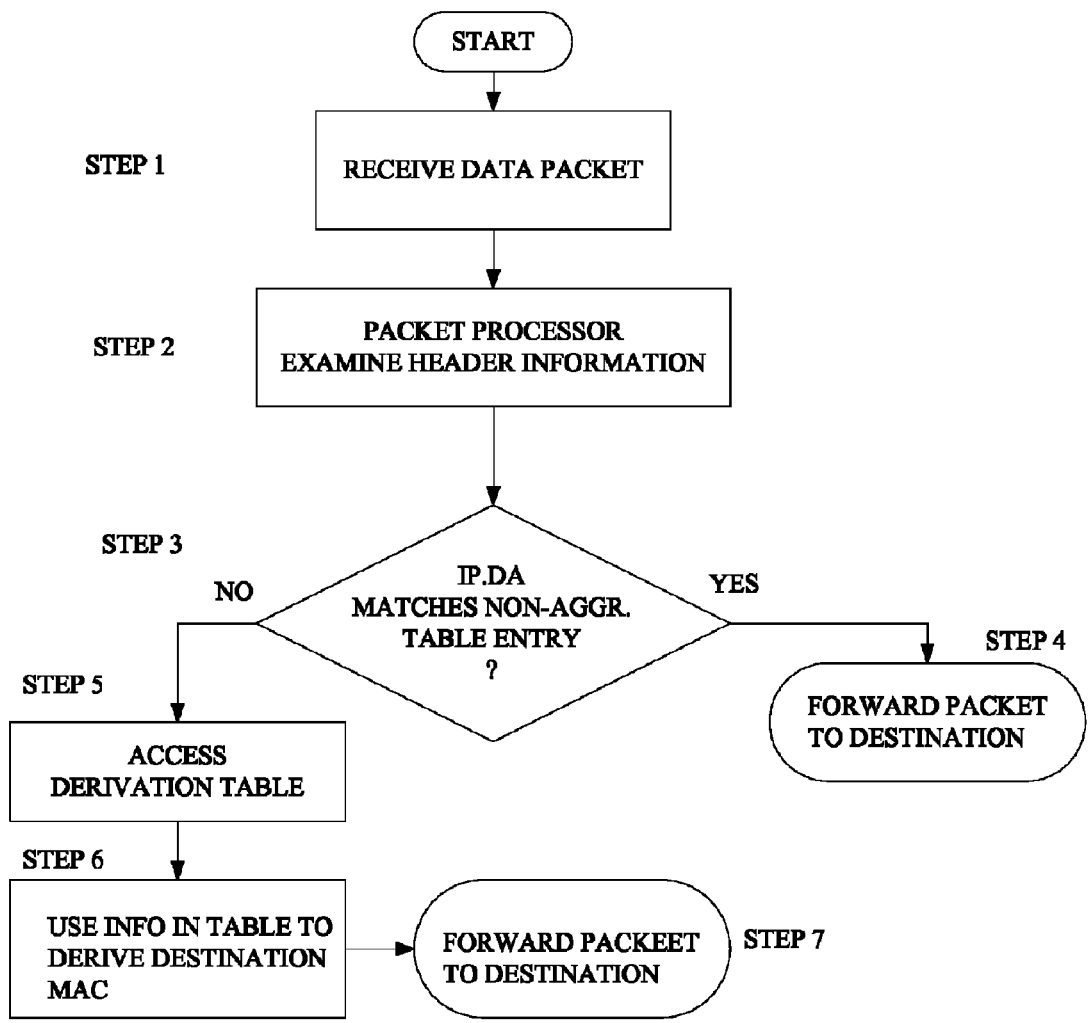
FIG. 6 is a logical flow diagram of the process for forwarding a data packet using the aggregated table of FIG. 4.

The process by which a data packet is forwarded by the router 12 of FIG. 2 utilizing the aggregated ARP forwarding table 25*a* of FIG. 2 is described now with reference to the logical flow diagram of FIG. 6. In step 1, router 12 receives a data packet and in step 2 the packet processor 23 examines the destination address information included in the data packet header. In step 3, the packet processor compares the destination address information detected in the data packet header with IP.DAs included in each entry in the aggregated ARP forwarding table 25*a* to determine if there is a match. If the table entry matching the IP.DA in the data packet is a non-aggregated table entry, then in step 4 the data packet is forwarded using the destination address information included in the entry over the portID included in the entry. On the other hand, if the match is with an aggregated table entry, then in step 5 the process uses an aggregation function which includes instructions to use at least a portion of the IP.DA included in the data packet header as a key into the derivation table 23*c* of FIG. 2 and to use information included in the table, which can be an OUI for instance, in combination with at least a portion of the IP.DA included in the data packet to derive a destination address for the data packet which the packet processor enters into the header of the data packet. Then, in step 6 the router 12 forwards the data packet to its destination over the portID included in the entry in aggregated forwarding table 23*b*.

Figure 7:
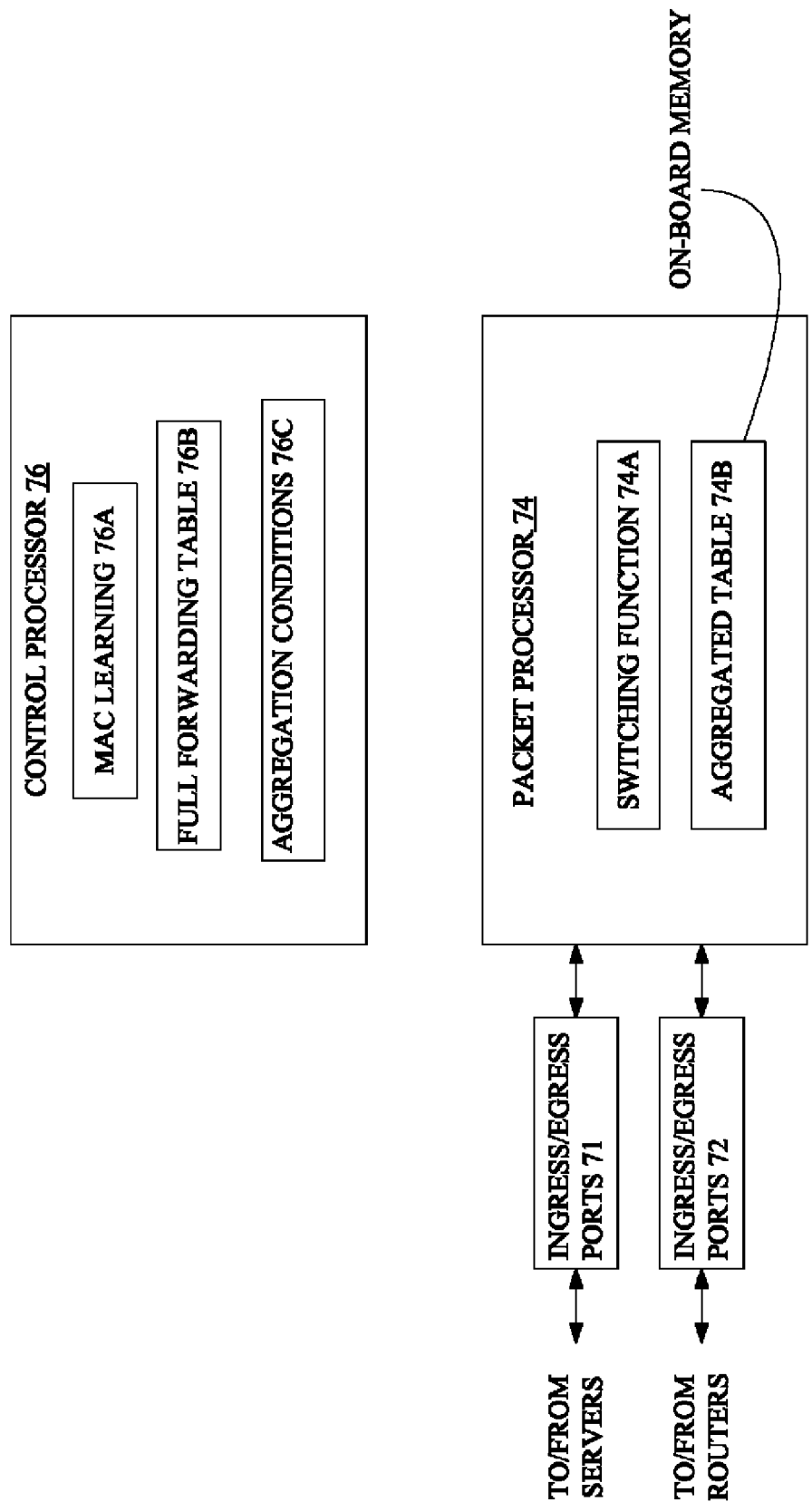
FIG. 7 is a functional block diagram of one of the switches of FIG. 1.

FIG. 7 is a diagram showing functionality comprising either layer 2 data packet switching functionality comprising either router 12 or a network switch such as any one of the switches 0-119 described with respect to FIG. 1. For the purpose of this description, we refer to this L2/L3 device as switch 70 that is connected to the LAN 10 in the manner of router 12 or any one of the TOR devices shown in FIG. 1. One set of ingress/egress ports 71 are shown connected to a packet processor 74 that operates in the forwarding plane of switch 70. The ingress/egress ports 71 represent, in this case, one hundred twenty sets of ingress/egress port pairs. Only one pair is shown here for simplicity of description, however, it should be understood that the port count is not limited to one hundred twenty ingress/egress pairs. Each of the ingress/egress port pairs 71 operate to receive and transmit data packets from and to either the TOR devices 0-119 or the servers described with reference to FIG. 1. The packet processor 74 can be implemented as a single electronic device or as multiple devices that operate together to perform the data packet forwarding operation. Generally, the packet processor 74 is comprised of data packet switching functionality 74*a* that operates to examine information included in the header of each data packet arriving at the switch 70 in order to determine how to switch the data packet to its destination, and it includes on-board memory for storing an aggregated layer 2 switching table 74*b*. Switch 70 also includes a control processor 76 that is in communication with the packet processor 74 over an inter-process communication (IPC) link. The control processor 76 functionality typically operates in the control plane of the switch 70 and can be implemented in a single electronic device or in multiple devices. Regardless, the control processor 76 can run a standard network address learning process 76*a* that operates to build and maintain a full layer 2 switching table 76*b*. Each entry in the switching table can be comprised of a destination medium access control (MAC) address and an egress portID over which the destination address is learned. In one embodiment, the control processor 76 includes a set of aggregation conditions 76*c* that the switch 70 can employ in combination with the information in MAC switching table 76*b* to build and maintain the aggregated switching table 74*b* which can be stored in on-board memory associated with the packet processor 74. As with the aggregated forwarding table 23*a* described earlier with respect to FIG. 2, the aggregated switching table 74*b* built according to this embodiment can include significantly fewer entries than comprise the forwarding table 76*b* maintained by the control processor 76. In operation, the control processor 76 employs information in the MAC forwarding table 76*b* and the aggregation conditions 76*c* to aggregate two or more network addresses into a single aggregated network address and populate one table entry in the aggregated forwarding table 74*b* with this aggregated address. As a result of this aggregation process, the aggregated forwarding table 74*b* can be populated with only a subset of the network addresses that comprise the full MAC forwarding table 76*b* maintained by the control processor 76.

Continuing to refer to FIG. 7, as described above, the switching table 74*b* is comprised of only a fraction of the number of table entries included in the full MAC switching table 76*b* maintained by the control processor 76. A typical prior art MAC switching table used by a packet processor to switch packets includes all of the destination MAC addresses that is learns during the destination address learning process. This includes a separate table entry for each MAC address associated with each node the switch can reach in the network 10 of FIG. 1. As described earlier with reference to FIG. 1, each of the forty servers 0-39 managed by each of one hundred twenty TOR devices 0-199 can support one hundred twenty eight VMs, and each VM is assigned a different MAC address. In this case, the total number of MAC addresses that can be included in a prior art MAC switching table stored in a network device such as the router 12 of FIG. 1 comes to a total of six hundred fourteen thousand four hundred (614, 400). In order to achieve a significant reduction in the number of level 2 switching table entries, it was discovered that the table entries can minimized by aggregating two or more of the destination MAC addresses according to a predetermined set of aggregation conditions 76*c*.

FIG. 8 is an example format that can be used to implement the full MAC switching table 76*b* built and maintained by the control processor 76 of FIG. 7 in accordance with the LAN topology of FIG. 1. Each entry in table 76*b* is comprised of two fields, namely, a first field including a network address which in this case is the destination MAC address and a second field including the interface (egress portID) on which the MAC address was learned. The switching table 76*b* includes the network address of each TOR device and of each of the VMs supported by each one of the servers managed by each of the TORs. Optimally, the network addresses for each node can be placed in the table entries by the control processor 76 as contiguous groups of sequential addresses. So for example, one grouping of table entries can include the following four sequential network addresses (assuming that the OUI is K: K192.168.1.0, K192.168.1.1, K192.168.1.2, K192.168.1.3. As described earlier, there are very often restrictions on the amount of memory space that is available in a packet processor to store forwarding tables, and so it is problematical if the number of table entries needed to forward data packets in the LAN exceeds the capacity of this memory to store the table.

FIG. 8*a* is a logical flow diagram of the process used to evaluate the network addresses comprising the MAC switching table 76*b* for aggregation. While the operation of MAC address aggregation process is described here as a serial process, the order of the steps can be modified. Also, it should be understood that although aggregation process is described here as a serial process, it can also be performed in a parallel manner. Further, and as described earlier, depending upon the table size reduction desired, not all of the process steps may need to be performed. In step 1, the control processor 76 of FIG. 7 can periodically examine a portion or all of the entries in the full MAC switching table 76*b* to determine whether any two or more entries meet certain pre-determined aggregation conditions. Assuming that the process is serial, if in step 2 it is determined that two or more entries include the same egress portID, the information included in the two or more entries identified in this step is stored and the process proceeds to step 3, otherwise the process returns to step 1. In step 3, the information included in the two of more entries identified in step 2 is examined to determine whether the MAC addresses are unicast and whether the admin (LAA) bit is set. If it is determined that this is the case then the process proceeds to step 4, otherwise the process returns to step 1. In step 4, information in the entries identified in step 3 is examined to determine if two or more MAC addresses match. This can be determined by, but not limited to, matching some number of prefix or suffix bits, for instance. If as the result of step 4, two or more MAC addresses are determined to be match, then the process proceeds to step 5, otherwise the process returns to step 1. In step 5 information included in the resulting two or more MAC addresses is examined to determine whether the addresses are in a contiguous range, and if they are, then the process proceeds to step 6. Otherwise, the process returns to step 1. In step 6, the two or more MAC addresses are aggregated to form a single, summarized MAC address and this aggregated MAC address is placed into an entry comprising the aggregated MAC switching table 74*b* by the control processor 76. The resulting aggregated MAC switching table 74*b* can be built according to the format illustrated in FIG. 9.

FIG. 9 is an example format of an aggregated MAC switching table, such as table 74*b*. Each entry in the table is comprised of two fields. The first field can include a MAC address of a TOR device or it can include an aggregated MAC address such as the entry labeled 90 in FIG. 9 and the second field can include the egress interface or portID over which a data packet, including a MAC address that matches the address in the first field, should be transmitted. The first field in entry 90 of FIG. 9 includes an aggregated MAC address which is a summary of up to one hundred twenty eight different MAC addresses, with each different MAC address corresponding to the MAC address of up to one hundred twenty eight difference VMs. The second field in entry 90 includes the portID over which a packet with a matching MAC address should be transmitted. Optimally, an aggregated switching such as table 74b implemented in a router, such as router 12 is comprised of one entry for each of the TOR devices (which in this case is one hundred twenty entries). If the aggregated switching table is implemented on one of the TOR devices, then the table can optimally include forty entries, one entry that represents an aggregation of one hundred twenty eight VM MAC addresses for each one of the servers.

Referring again to FIG. 7, in operation, the switch 70 can receive a data packet over one of the ingress ports 71, the packet process packet switching function 24a can examine the destination MAC address included in the data packet header and use at least some portion of the IP.DA address in the header as a key into the aggregated MAC switching table 74b. If there is a match between the IP.DA included in the data packet header and an IP.DA included in the first field of a table entry, then the packet is sent out over the portID included in the second field of that table entry.

The techniques presented above are exemplary. Many of the functions described above can be performed in multiple ways other than those described, as will be apparent to those familiar with the art after reading this description. Some nodes may have functionality that allows them to perform particular functions more efficiently or in a different order than in the manner described—the above description is presented in general terms with the recognition that individual implementations will differ. In a given embodiment, various ones of the functions described above can be performed in hardware, in software, or in some combination of the two. Although a given implementation may contain all or a great deal of the functionality described above, many of the concepts described above can be implemented independent of the other concepts or in conjunction with a greatly reduced set of the overall spanning tree ring architecture described. Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the claims.

We claim:

1. A method for reducing the size of a first forwarding table, comprising:
 a packet network device learning at least one network address for each of a plurality of network nodes and storing in the first forwarding table the at least one network address in association with a portID on which the at least one address is learned; and
 determining that at least two of the network addresses stored in the first forwarding table meet a predetermined set of network address aggregation conditions, aggregating the at least two network addresses into a single, aggregated network address and storing the aggregated network address in a second forwarding table;
 wherein the predetermined set of network address aggregation conditions include conditions that the at least two network addresses have the same egress port ID, the same unique identifier, and at least one element of next hop information that is the same.

2. The method of claim 1, wherein the size of the first and second forwarding tables is determined by the number of table entries.

3. The method of claim 2, wherein aggregated table entries comprising the second forwarding table do not include a destination address.

4. The method of claim 2, wherein the second forwarding table entries are comprised of one or more of a network address, a VLANID and a portID.

5. The method of claim 4, wherein the network address is one or both of an IP destination address and a destination MAC address.

6. The method of claim 5, wherein the destination MAC address is comprised of an organizationally unique identifier and at least a portion of an IP destination address.

7. The method of claim 1, wherein the at least one network address stored in association with a portID comprises one forwarding table entry.

8. The method of claim 1, wherein the set of predetermined network address aggregation conditions are selected to aggregate network addresses without altering the forwarding behavior of the packet network device.

9. The method of claim 1 wherein the set of predetermined network address aggregation conditions, includes a condition that two or more network addresses are unicast and have an administrative bit set and a condition that two or more network addresses match.

10. The method of claim 9 further comprising a condition that two or more network addresses are in a contiguous address range.

11. The method of claim 1 wherein the aggregated network address is stored in a second forwarding table in association with the portID.

12. The method of claim 9 wherein matching the two or more network addresses includes either matching address prefixes or suffixes.

13. The method of claim 1 further comprising a derivation table comprising packet network device information used to derive a destination address.

14. The method of claim 13 wherein the packet network device information used to derive the destination address is comprised of an organizationally unique identifier and at least a portion of the IP destination address associated with each one of the plurality of network nodes.

15. A packet network device, comprising:
 ingress and egress ports;
 a packet processor; and
 a control processor for building and maintaining a full forwarding table comprising two or more network addresses and, subject to a set of network address aggregation conditions, for determining that two or more of the network addresses can be aggregated and entering the aggregated network addresses into an aggregated forwarding table stored in memory associated with the packet processor which uses the aggregated addresses to forward packets received over any one of the ingress ports by the packet network device to their destination over the correct egress port
 wherein the set of network address aggregation conditions include conditions that the two or more network addresses have the same egress port ID, the same unique identifier, and at least one element of next hop information that is the same.

16. The packet network device of claim 15 wherein the aggregated forwarding table stored in the packet processor memory is comprised of a network address, a VLANID and an portID.

17. The packet network device of claim 15 wherein the aggregated forwarding table stored in the packet processor memory is comprised of an organizationally unique identifier (OUI) and at least a portion of a destination IP address.

18. The packet network device of claim 15 performs one or both of a network routing functionality and a network switching functionality.

19. The packet network device of claim 15 wherein the packet processor is comprised of packet forwarding functionality and an aggregated forwarding table stored in on-board memory that is maintained by the control processor.

20. The packet network device of claim 19 wherein the packet processor includes a derivation table comprising packet network device information used to derive a destination address.

21. The packet network device of claim 20 wherein the packet processor uses the packet network device information in the derivation table to derive a destination address for a packet received by the packet network device over any one of the ingress ports when the destination address of incoming packet matches an aggregated network address included in the aggregated forwarding table.

* * * * *